United States Patent
Endo et al.

(10) Patent No.: US 6,872,447 B1
(45) Date of Patent: Mar. 29, 2005

(54) SURFACE-PROTECTIVE PRESSURE-SENSITIVE ADHESIVE SHEET

(75) Inventors: Mikihiro Endo, Tokyo (JP); Syuji Ichimura, Tokyo (JP); Kazuhiro Kono, Tokyo (JP); Yoshinaga Tsuzuki, Tokyo (JP)

(73) Assignee: Nichiban Company Limited, Tokyo (JP)

( * ) Notice: Subject to any disclaimer, the term of this patent is extended or adjusted under 35 U.S.C. 154(b) by 20 days.

(21) Appl. No.: 09/787,157

(22) PCT Filed: Jul. 11, 2000

(86) PCT No.: PCT/JP00/04610

§ 371 (c)(1),
(2), (4) Date: Mar. 14, 2001

(87) PCT Pub. No.: WO01/05589

PCT Pub. Date: Jan. 25, 2001

(30) Foreign Application Priority Data

Jul. 14, 1999 (JP) .......................... 11/200565

(51) Int. Cl.$^7$ .............................. B32B 15/04; B32B 7/12
(52) U.S. Cl. ...................... 428/343; 438/353; 438/354; 438/355 R
(58) Field of Search ................................ 428/343, 354, 428/355 R, 353

(56) References Cited

U.S. PATENT DOCUMENTS

| 4,410,582 A | | 10/1983 | Tsunashima et al. | 428/212 |
|---|---|---|---|---|
| 5,232,787 A | * | 8/1993 | Gotoh et al. | 428/523 |
| 5,427,850 A | * | 6/1995 | Gotoh et al. | 428/355 |
| 5,567,515 A | * | 10/1996 | Koga et al. | 428/355 |
| 5,773,142 A | | 6/1998 | Murschall et al. | 428/349 |

FOREIGN PATENT DOCUMENTS

| JP | 07026212 A | * | 1/1995 |
|---|---|---|---|
| JP | 11021519 A | * | 1/1999 |
| JP | 2000-168006 | * | 6/2000 |

OTHER PUBLICATIONS

Computer translation of JP 07–026212.*
Computer translated English version of JP 07–026212.*
EP 203425A Derwent Abstract.*
JP 408012956A Abstract.*
JP 410176148A Abstract.*
Derwent Acc. No. 2000–589534, JP 2000168006 Abstract.*

* cited by examiner

Primary Examiner—Arti R. Singh
Assistant Examiner—Victor S Chang
(74) Attorney, Agent, or Firm—Edwards & Angell, LLP; Peter F. Corless; Richard J. Roos

(57) ABSTRACT

The pressure-sensitive adhesive sheet for surface protection has a three-layered film formed by laminating a layer A, a layer B and a layer C in this order and a pressure-sensitive adhesive layer formed on the layer C; wherein the layer A contains a polyethylene in an amount of at least 60% by weight based on a total weight of the layer A; the layer B contains a polypropylene type polymer in an amount of at least 50% by weight of based on a total weight of the layer B; and the layer C contains a hydrogenated styrene/diene type hydrocarbon copolymer in an amount of at least 10% by weight based on the total weight of the layer C. This sheet has excellent weathering resistance to undergo neither chalking nor fracture in the substrate at peeling, even after a prolonged outdoor exposure, develops less corona odor to enable extended operation of applying it, and can be manufactured inexpensively with reduced manufacturing process, since no anchor coat treating procedure is required.

11 Claims, No Drawings

SURFACE-PROTECTIVE PRESSURE-SENSITIVE ADHESIVE SHEET

TECHNICAL FIELD

The present invention relates to a pressure-sensitive adhesive sheet for surface protection which has excellent weathering resistance to undergo neither chalking nor fracture in the substrate at peeling, even after a prolonged outdoor exposure, which develops less corona odor to enable extended operation of applying it, and which can be manufactured inexpensively with reduced manufacturing process, since no anchor coat treating procedure is required.

BACKGROUND ART

Techniques for protecting a top coating surface formed on the surface of a body of a finish-coated car are disclosed, for example, in Japanese Provisional Patent Publication Nos. Hei 8-143830 and Hei 8-143838 and Japanese Patent Application No. Hei 9-322574. These techniques predominantly use application of pressure-sensitive adhesive sheets for protecting directly to coating surfaces. Such pressure-sensitive adhesive sheets each uses as a substrate a polypropylene type film in view of its strength, flexibility, thermal resistance, etc. However, polypropylene type films undergo chalking when subjected to long outdoor exposure to cause dusting at peeling to litter the surfaces of car bodies with white powder particles, disadvantageously. In addition, polypropylene type films develop strong scorching odor due to corona discharge treatment applied to them for securing adhesion with a release agent, an anchor coating agent, a pressure-sensitive adhesive, etc., which remains considerably after pressure-sensitive adhesive sheets are completed. This gives rise to problems of injuring health of operators that they are suffered from headache and the like induced by such odor if they carry out application for an extended period.

It is an objective of the present invention to provide a pressure sensitive adhesive sheet for surface protection which has excellent weathering resistance to undergo neither chalking nor fracture in the substrate at peeling, even after a prolonged outdoor exposure, which develops less corona odor to enable extended operation of applying it, and which can be manufactured inexpensively with reduced manufacturing process, since no anchor coat treating procedure is required.

DISCLOSURE OF THE INVENTION

The present invention (1) relates to a pressure-sensitive adhesive sheet for surface protection having a three-layered film in which a layer A, a layer B and a layer C have been laminated in this order and a pressure-sensitive adhesive layer on the layer C; wherein the layer A contains a polyethylene in an amount of at least 60% by weight based on the total weight of the layer A; the layer B contains a polypropylene type polymer in an amount of at least 50% by weight based on the total weight of the layer B; and the layer C contains a hydrogenated styrene/diene type hydrocarbon copolymer in an amount of at least 10% by weight based on the total weight of the layer C.

The present invention (2) relates also to the pressure-sensitive adhesive sheet for surface protection (1), wherein the layer C contains an ultraviolet stabilizer in an amount of not less than 0.1 part by weight per 100 parts by weight of the hydrogenated styrene/diene type hydrocarbon copolymer contained in the layer C and not more than 0.5% by weight based on the total weight of the layer C.

The present invention (3) relates also to the pressure-sensitive adhesive sheet for surface protection (1 or 2), wherein at least one layer in the three-layered film contains titanium dioxide, and the three-layered film has a total titanium dioxide content of 5 to 20% by weight based on the total weight of the three-layered film.

The present invention (4) relates also to the pressure-sensitive adhesive sheet for surface protection (3), wherein the layers containing titanium dioxide all further contain an ultraviolet stabilizer, and each titanium dioxide-containing layer contains the ultraviolet stabilizer in an amount of not less than 0.5 part by weight per 100 parts by weight of the titanium dioxide contained in that layer and not more than 0.5% by weight based on the total weight of that layer.

The present invention (5) relates also to the pressure-sensitive adhesive sheet for surface protection (1 to 4), wherein the layer A contains an ultraviolet absorber in an amount of 0.05 to 0.5% by weight based on the total weight of the layer A.

BEST MODE FOR CARRYING OUT THE INVENTION

The layer A according to the present invention contains 60 to 100% by weight of polyethylene based on the total weight of the layer A. Here, the polyethylene used in the layer A preferably has a density of 0.91 to 0.97, a melt flow rate (hereinafter abbreviated as MFR; ASTM D1238) of 0.02 to 30 g/10 minutes (190° C.; load: 2.16 kg), more preferably an MFR of 0.1 to 10 g/10 minutes in view of film forming properties, flexibility of resulting adhesive sheet, etc.

Other components that can be contained in the layer A include, for example, polymers other than polyethylene and additives. Other polymers include a blend of at least one kind of component selected from the group consisting of polypropylenes, ethylene/propylene copolymers, ethylene/propylene/diene type hydrocarbon copolymers, ethylene/butene-1 copolymers, ethylene/α-olefin copolymers, ethylene/methacrylic copolymers, metal salts of ethylene/methacrylic copolymers, ethylene/methyl (meth)acrylate copolymers, ethylene/ethyl (meth)acrylate copolymers, ethylene/vinyl acetate copolymers, olefin crystal/diene hydrocarbon/olefin crystal block copolymers (including hydrogenated products thereof), styrene/diene type hydrocarbon/olefin crystal block copolymers (including hydrogenated products thereof), styrene/diene type hydrocarbon/styrene block copolymers (including hydrogenated products thereof) and styrene/diene type hydrocarbon random copolymers (including hydrogenated products thereof). Other polymers are preferably those having an MFR of 0.1 to 30 g/10 minutes (190° C.; load: 2.16 kg) or those having an MFR of 0.5 to 30 g/10 minutes (230° C.; load: 2.16 kg) in view of compatibility with the base polymer, film forming properties and the like.

Further, in view of weathering resistance, the layer A preferably contains an ultraviolet absorber in an amount of 0.05 to 0.5% by weight based on the total weight of the layer A. The ultraviolet absorber includes, for example, benzotriazole compounds which may be used singly or as a blend of two or more kinds of them.

The layer B according to the present invention contains a polypropylene type polymer in an amount of 50 to 100% by weight based on the total weight of the layer B. Here, the polypropylene type polymer to be contained in the layer B includes, for example, homopolypropylenes and ethylene/ propylene copolymers (block copolymers or random copolymers which are generally referred to as block polypropylene or random polypropylenes). Those having an MFR of 0.3 to 10 g/10 minutes (230° C.; load: 2.16 kg) are preferred in view of film forming properties, as well as, tensile strength and flexibility of the resulting pressure-sensitive adhesive sheet.

The layer B may contain polymers other than polypropylene polymers and additives. Other polymers include a blend of at least one kind of component selected from the group consisting, for example, of polyethylenes, ethylene/propylene/diene type hydrocarbon copolymers, ethylene/butene-1-copolymers, ethylene/α-olefin copolymers, ethylene/methacrylic copolymers, metal salts of ethylene/methacrylic copolymers, ethylene/methyl (meth)acrylate copolymers, ethylene/ethyl (meth)acrylate copolymers, ethylene/vinyl acetate copolymers, olefin crystal/diene hydrocarbon/olefin crystal block copolymers (including hydrogenated products thereof), styrene/diene type hydrocarbon/olefin crystal block copolymers (including hydrogenated products thereof), styrene/diene type hydrocarbon/styrene block copolymers (including hydrogenated products thereof) and styrene/diene type hydrocarbon random copolymers (including hydrogenated products thereof). Further, those having an MFR of 0.02 to 10 g/10 minutes measured at 190° C. under a load of 2.16 kg or those having an MFR of 0.3 to 10 g/10 minutes (230° C.; load: 2.16 kg) are preferred in view of compatibility with the base polymer, film forming properties and the like.

The layer C according to the present invention contains a hydrogenated styrene/diene type hydrocarbon copolymer in an amount of 10 to 100% by weight based on the total weight of the layer C. The hydrogenated styrene/diene type hydrocarbon copolymer contained in the layer C is preferably a block copolymer or a random copolymer having an MFR of 0.3 to 10 g/10 minutes (230° C.;

load: 2.16 kg) and a styrene content of 5 to 40 wt % in view of adhesion with the pressure-sensitive adhesive layer, film forming properties and the like. The layer C may contain polymers other than the hydrogenated styrene/diene type hydrocarbon copolymer and additives. Other polymers include a blend of at least one kind of component selected from the group consisting, for example, of polyolefin polymers such as polyethylenes, polypropylenes, ethylene/propylene copolymers, ethylene/propylene/diene type hydrocarbon copolymers, ethylene/butene-1-copolymers, ethylene/α-olefin copolymers, ethylene/methacrylic copolymers, metal salts of ethylene/methacrylic copolymers, ethylene/methyl (meth)acrylate copolymers, ethylene/ethyl (meth)acrylate copolymers, ethylene/vinyl acetate copolymers, olefin crystal/diene hydrocarbon/olefin crystal block copolymers (including hydrogenated products thereof) and styrene/diene type hydrocarbon/olefin crystal block copolymers (including hydrogenated products thereof). Further, those having an MFR of 0.1 to 30 g/10 minutes measured at 190° C. under a load of 2.16 kg or those having an MFR of 0.5 to 30 g/10 minutes (230° C.; load: 2.16 kg) are preferred in view of compatibility with the hydrogenated styrene/diene type hydrocarbon copolymer, film forming properties and the like.

The layer C preferably contains an ultraviolet stabilizer in an amount of not less than 0.1 part by weight per 100 parts by weight of the hydrogenated styrene/diene type hydrocarbon copolymer contained in the layer C and not more than 0.5% by weight based on the total weight of the layer C. The ultraviolet stabilizer includes, for example, hindered amine compounds and benzoate compounds, and these compounds may be used singly or as a blend of two or more kinds of them.

In the three-layered film (layer A/layer B/layer C) according to the present invention, it is preferred that one or two of these three layers or all of them contain titanium dioxide. The three-layered film preferably has a total titanium dioxide content of 5 to 20 wt % based on the total weight of the three-layered film. As the titanium dioxide, a surface-inactivated titanium dioxide treated, for example, with alumina or silica which hardly forms radicals under ultraviolet irradiation is preferred in view of weathering resistance. If a surface-activated titanium dioxide is used, radicals are formed on the surface of the titanium dioxide upon ultraviolet irradiation to accelerate deterioration of the substrate layers. Further, the titanium dioxide preferably has a particle diameter of 0.1 to 0.4 μm.

All of the layers containing titanium dioxide preferably contain additionally an ultraviolet stabilizer. It is also preferred that each layer containing titanium dioxide has an ultraviolet stabilizer content of not less than 0.5 part by weight per 100 parts by weight of the titanium dioxide contained therein and not more than 0.5% by weight based on the total weight of the layer.

The layers A to C may contain various kinds of additives respectively other than those described above, so long as they do not impair the intended objective of the present invention. The additives include, for example, softening agents such as oils, paraffin waxes, epoxy plasticizers and polyester plasticizers; pigments such as titanium dioxide, carbon black and red oxide; fillers such as talc and calcium carbonate; lubricants such as stearic acid, stearoyl amide, calcium stearate, barium stearate and zinc stearate; antioxidants such as phenol compounds, phosphite compounds and thioether compounds; ultraviolet absorbers or stabilizers such as benzotriazole compounds, hindered amine compounds and benzoate compounds; inorganic hollow p articles such as glass balloons and silica balloons; microspheres of polymer such as acrylic microspheres and high molecular weight polyolefin powders; and releasability imparting agents such as silicone compounds and long-chain alkyl compounds.

While the pressure-sensitive adhesive layer according to the present invention is no t particularly limited, it is preferably a rubber type pressure-sensitive adhesive, particularly preferably at least one kind of component selected from the group consisting of polyisobutylene, butyl rubber and polybutene.

The pressure-sensitive adhesive layer may, as necessary, contain various kinds of additives so long as they do not impair the intended objective of the present invention. The additives include, for example, softening agents such as oils, paraffin waxes, epoxy plasticizers and polyester plasticizers; pigments such as titanium dioxide, carbon black and red oxide; fillers such as talc and calcium carbonate; lubricants such as stearic acid, stearoyl amide, calcium stearate, barium stearate and zinc stearate; antioxidants such as phenol compounds, phosphite compounds and thioether compounds; ultraviolet absorbers or stabilizers such as benzotriazole compounds, hindered amine compounds and benzoate compounds; inorganic hollow particles such as glass balloons and silica balloons; microspheres of polymers such as acrylic microspheres and high molecular weight polyolefin powders; and releasability imparting agents such as silicone compounds and long-chain alkyl compounds.

Referring to the thickness of the substrate layers, the layers A, B and C have thickness values of preferably 2 to 200 μm, 2 to 400 μm and 2 to 200 μm, respectively, more preferably 5 to 50 μm, 10 to 100 μm and 5 to 50 μm, respectively. The pressure-sensitive adhesive layer has a thickness of preferably 2 to 100 μm. more preferably 5 to 30 μm.

The pressure-sensitive adhesive sheet for surface protection according to the present invention is prepared by forming a three-layered film consisting of a layer A, a layer B and a layer C. After the film is subjected to one-side corona treatment on the layer A side, the resulting layer A side is treated with a releasing agent, and a pressure-sensitive adhesive layer is then formed on the layer C side by means of solution coating or hot melt extrusion coating. Alternatively, substrate layers and a pressure-sensitive adhesive layer are coextruded to form a layer A/layer B/layer C/pressure-sensitive adhesive layer, followed successively by one-side corona treatment and releasing agent application treatment on the layer A side in a continuous process.

The present invention will be described below specifically by way of nonlimitative examples.

Components used are as follows:
(1) High-density polyethylene (hereinafter abbreviated as "HPE")
HPE-1: HI-ZEX 6800S (high-density polyethylene, manufactured by Mitsui Chemicals, Inc.)
(2) Low-density polyethylene (hereinafter abbreviated as "LPE")
LPE-1: JF630S (low-density polyethylene, manufactured by JAPAN POLYOLEFINS Co., Ltd.)
(3) Polypropylene (hereinafter abbreviated as "HPP")
HPP-1: IDEMITSU POLYPRO F-200S (polypropylene, manufactured by Idemitsu Petrochemical Co., Ltd.)
(4) Ethylene/propylene copolymer (hereinafter abbreviated as "EPP"
EPP-1: NOBLEN BJS-M (ethylene/propylene block copolymer, manufactured by Mitsui Chemicals, Inc.)
(5) Ethylene/butene-1 copolymer (hereinafter abbreviated as "EBM")
EBM-1: JSR EBM2011P (ethylene/butene-1 random copolymer, manufactured by JSR Corporation)
(6) Hydrogenated styrene/diene type hydrocarbon copolymer (hereinafter abbreviated as "HSR")
HSR-1: DYNARON 1320P (hydrogenated styrene/butadiene random copolymer, manufactured by JSR Corporation)
(7) Titanium dioxide (hereinafter abbreviated as "TIO")
TIO-1: TIPAQUE CR90 (rutile type surface-inactivated titanium dioxide, manufactured by ISHIRARA SANGYO KAISYA, LTD.)
(8) Ultraviolet stabilizer (hereinafter abbreviated as HLS
HLS-1: TINUBIN 622LD (hindered amine ultraviolet stabilizer, manufactured by Ciba Specialty Chemicals)
(9) Ultraviolet absorber (hereinafter abbreviated as "UVA")
UVA-1: TINUVIN 326 (benzotriazole ultraviolet absorber, manufactured by Ciba Specialty Chemicals)
(10) Antioxidant (hereinafter abbreviated as "AO")
AO-1: IRGANOX 1010 (hindered phenol antioxidant, manufactured by Ciba Specialty Chemicals)
(11) Polyisobutylene (hereinafter abbreviated as "PIB")
PIB-1: VISTANEX MML80 (polyisobutylene, manufactured by Exxon Corp.; $M_{r,v}$: 990,000)
(12) Polybutene (hereinafter abbreviated as "PB")
PB-1: IDEMITSU POLYBUTENE 300R (polybutene, manufactured by Idemitsu Petrochemical Co., Ltd.; $M_n$: 1330)

EXAMPLES 1 TO 3 AND COMPARATIVE EXAMPLES 1 TO 6

Compositions shown in Table 1 were coextruded through a T-die extruder to form 60 μm-thick three-layered films having a ratio of layer A/layer B/layer C=10:40:10, respectively. Next, each film was subjected to one-side corona treatment on the layer A side so that the film may have a surface wettability of 50 dyn/cm immediately after the treatment, followed by treatment of the same side with a long-chain alkyl releasability imparting agent. Subsequently, a pressure-sensitive adhesive containing PIB-1/PB-1/UVA-1/AO-1=70/30/0.5/0.5 (in terms of weight ratio) in a toluene solvent was applied to the layer C side to a thickness of 10 μm by means of solution coating.

TABLE 1

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Layer A |  |  |  |  |  |  |  |  |  |
| HPE-1 | 70.00 | 65.00 | 70.00 | 30.00 | 99.80 | 30.00 | 99.88 | 30.00 | 30.00 |
| LPE-1 | 29.80 |  |  |  |  | 69.70 |  |  |  |
| EPP-1 |  |  | 29.70 | 69.70 |  |  |  | 69.70 | 69.70 |
| TIO-1 |  | 34.50 |  |  |  |  |  |  |  |
| HLS-1 |  | 0.20 |  |  |  |  |  |  |  |
| UVA-1 | 0.10 | 0.15 | 0.15 | 0.15 | 0.10 | 0.15 | 0.02 | 0.15 | 0.15 |
| AO-1 | 0.10 | 0.15 | 0.15 | 0.15 | 0.10 | 0.15 | 0.10 | 0.15 | 0.15 |
| Layer B |  |  |  |  |  |  |  |  |  |
| HPP-1 | 60.00 |  |  | 60.00 | 30.00 | 30.00 | 30.00 | 60.00 | 67.00 |
| EPP-1 |  | 75.00 | 75.00 |  |  |  |  |  |  |
| EBM-1 | 15.00 | 24.80 | 24.80 | 30.00 | 60.00 | 60.00 | 60.00 | 30.00 | 30.00 |
| TIO-1 | 24.70 |  |  | 9.80 | 9.80 | 9.80 | 9.80 | 9.88 | 2.80 |
| HLS-1 | 0.20 | 0.10 | 0.10 | 0.10 | 0.10 | 0.10 | 0.10 | 0.02 | 0.10 |
| AO-1 | 0.10 | 0.10 | 0.10 | 0.10 | 0.10 | 0.10 | 0.10 | 0.10 | 0.10 |
| Layer C |  |  |  |  |  |  |  |  |  |
| HPP-1 | 40.00 |  |  | 40.00 |  |  |  | 40.00 |  |
| EPP-1 |  | 75.00 | 40.00 |  | 75.00 | 97.00 | 75.00 |  | 75.00 |
| HSR-1 | 59.80 | 24.80 | 25.00 | 59.80 | 24.80 | 2.80 | 24.80 | 59.80 | 24.80 |
| TIO-1 |  |  | 34.65 |  |  |  |  |  |  |
| HLS-1 | 0.10 | 0.10 | 0.25 | 0.10 | 0.10 | 0.10 |  | 0.10 | 0.10 |
| AO-1 | 0.10 | 0.10 | 0.10 | 0.10 | 0.10 | 0.10 |  | 0.10 | 0.10 |
| Titanium | 16.5% | 5.8% | 5.8% | 6.5% | 6.5% | 6.5% | 6.5% | 6.6% | 1.9% |

TABLE 1-continued

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| dioxide content in layers A, B and C | | | | | | | | | |

*Thickness: Layer A:Layer B:Layer C = 10 μm:40 μm:10 μm

The pressure-sensitive adhesive sheets for surface protection obtained in Examples 1 to 3 and Comparative Examples 1 to 6 were evaluated in terms of odor, adhesion between the substrate and adhesive layer, weathering resistance, as well as, application and peeling operability. Odor of the corona-treated films before application of the pressure-sensitive adhesive was also evaluated.

(1) Evaluation of Odor

Odor of each film immediately after the corona treatment and that of the film after application of the pressure-sensitive adhesive were evaluated.

(2) Evaluation of Adhesion between Substrate and Pressure-Sensitive Adhesive Layer An adhesive cellophane tape (Nichiban Co., Ltd.) was applied to a sample, and they were subjected to T-peeling at a rate of 0.3 m/min. to evaluate if the pressure-sensitive adhesive layer of the sample came off or not.

(3) Evaluation of Weathering Resistance

A sample was applied to a poor adherend acrylic paint film, followed by irradiation with carbon arc. The thus treated sample was then subjected to peeling at a rate of 40 m/min. to evaluate if fracture occurred or not in the substrate and if dusting due to chalking occurred or not during the peeling.

(4) Application and Peeling Operability

Operability when the sample was applied to a finished car coated with a poor adherend acrylic paint and operability when the sample was peeled after 6 month of outdoor exposure from the application were evaluated.

(5) Remarks

Paint film: poor adherend acrylic coating film (containing silicone) having a wettability (JIS K6768) of lower than 30 dyn/cm.

Carbon arc irradiation: 1000 hour irradiation using a sunshine weather meter (rainfall: 200 hrs.)

Test Result

Test results are shown in Table 2.

TABLE 2

|  | Example 1 | Example 2 | Example 3 | Comparative Example 1 | Comparative Example 2 | Comparative Example 3 | Comparative Example 4 | Comparative Example 5 | Comparative Example 6 |
|---|---|---|---|---|---|---|---|---|---|
| Odor | | | | | | | | | |
| Corona treated film | ○ | ○ | ○ | X | ○ | ○ | ○ | X | X |
| Pressure-sensitive adhesive sheet | ○ | ○ | ○ | X | ○ | ○ | ○ | X | X |
| Adhesion between substrate and pressure-sensitive adhesive layer | ○ | ○ | ○ | ○ | ○ | X | ○ | ○ | ○ |
| Weathering resistance | | | | | | | | | |
| Fracture in substrate at peeling | ○ | ○ | ○ | ○ | ○ | ○ | X | X | X |
| Chalking | ○ | ○ | ○ | X | ○ | ○ | ○ | X | X |
| Application and peeling operability | ○ | ○ | ○ | ○ | X | X | X | ○ | ○ |

Odor:
○: little odor
X: strong odor
Adhesion between the substrate and the pressure-sensitive adhesive layer:
○: no lifting occurred in the adhesive layer
X: lifting occurred in the adhesive layer
Fracture in the substrate at peeling:
○: no fracture occurred
X: fracture occurred
Chalking:
○: no white powder dusting occurred
X: white powder dusting occurred
Application and peeling operability:
○: excellent
X: poor operability due to the pressure-sensitive adhesive sheet being too soft As is clear from Table 2, the pressure-sensitive adhesive sheet for surface protection according to the present invention has excellent weathering resistance and can be peeled easily causing neither dusting of white powder particles due to chalking nor fracture in the substrate even when the sheet is peeled speedily after carbon arc irradiation. The sheet of the present invention also has excellent adhesion between the substrate and the pressure-sensitive adhesive layer, enables extended application operation due to reduced corona odor and can be applied and peeled with no difficulty.

What is claimed is:

1. A pressure-sensitive adhesive sheet for surface protection comprising a three-layered film in which a layer A, a layer B and a layer C have been laminated in this order and a pressure-sensitive adhesive layer on the layer C;

wherein the layer A contains a polyethylene polymer in an amount of at least 60% by weight based on a total weight of the layer A;

the layer B contains an ethylene/propylene copolymer in an amount of at least 50% by weight based on a total weight of the layer B; and the layer C contains a hydrogenated styrene/diene hydrocarbon random copolymer in an amount of at least 10% by weight based on a total weight of the layer C.

2. The pressure-sensitive adhesive sheet for surface protection according to claim 1, wherein the layer C contains an ultraviolet stabilizer in an amount of not less than 0.1 part by weight per 100 parts by weight of the hydrogenated styrene/diene hydrocarbon random copolymer contained in the layer C and not more than 0.5% by weight based on the total weight of the layer C.

3. The pressure-sensitive adhesive sheet for surface protection according to claim 1 or 2, wherein at least one layer in the three-layered film contains titanium dioxide, and the three-layered film has a total titanium dioxide content of 5 to 20% by weight based on the total weight of the three-layered film.

4. The pressure-sensitive adhesive sheet for surface protection according to claim 3, wherein the layers containing titanium dioxide all further contain an ultraviolet stabilizer, and each titanium dioxide-containing layer contains the ultraviolet stabilizer in an amount of not less than 0.5 part by weight per 100 parts by weight of the titanium dioxide contained in that layer and not more than 0.5% by weight based on the total weight of that layer.

5. The pressure-sensitive adhesive sheet for surface protection according to claim 1, wherein the layer A contains an ultraviolet absorber in an amount of 0.05 to 0.5% by weight based on the total weight of the layer A.

6. The pressure-sensitive adhesive sheet for surface protection according to claim 2, wherein the layer A contains an ultraviolet absorber in an amount of 0.05 to 0.5% by weight based on the total weight of the layer A.

7. The pressure-sensitive adhesive sheet for surface protection according to claim 3, wherein the layer A contains an ultraviolet absorber in an amount of 0.05 to 0.5% by weight based on the total weight of the layer A.

8. The pressure-sensitive adhesive sheet for surface protection according to claim 4, wherein the layer A contains an ultraviolet absorber in an amount of 0.05 to 0.5% by weight based on the total weight of the layer A.

9. The pressure-sensitive adhesive sheet for surface protection according to claim 1, wherein the layer B further contains an ethylene/butene-1 copolymer.

10. The pressure-sensitive adhesive sheet for surface protection according to claim 1, wherein the pressure-sensitive adhesive layer comprises a rubber type pressure sensitive adhesive.

11. The pressure-sensitive adhesive sheet for surface protection according to claim 10, wherein the rubber type pressure-sensitive adhesive comprises at least one component selected from the group consisting of polyisobutylene, butyl rubber and polybutene.

* * * * *